May 8, 1934.  H. F. SADGEBURY  1,957,671
CASH REGISTER
Filed Sept. 25, 1926   5 Sheets-Sheet 3
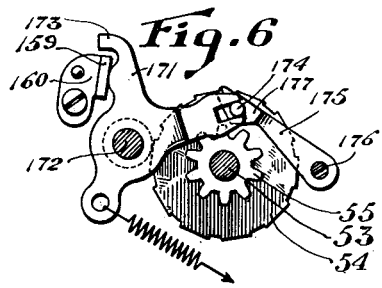
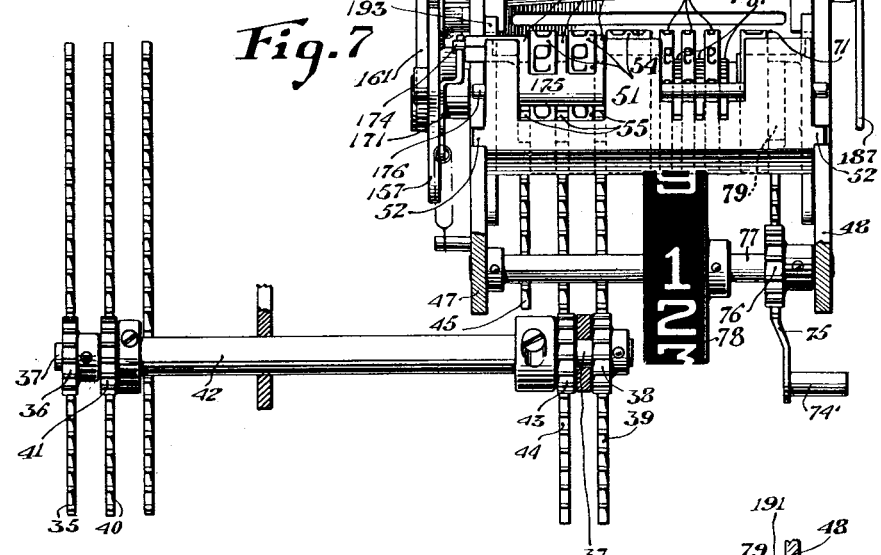
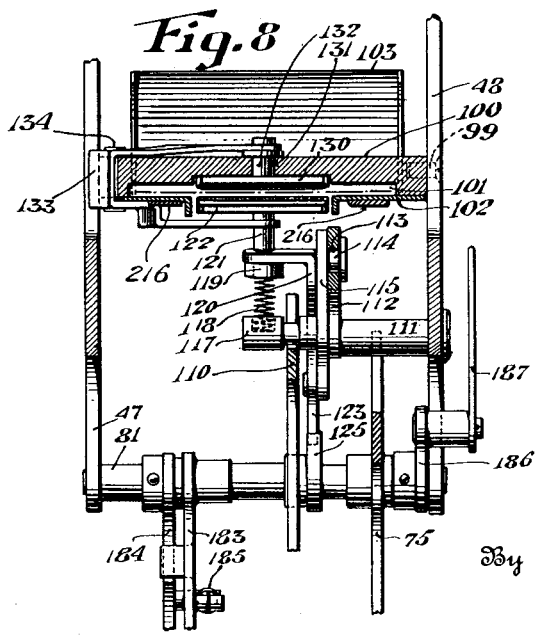
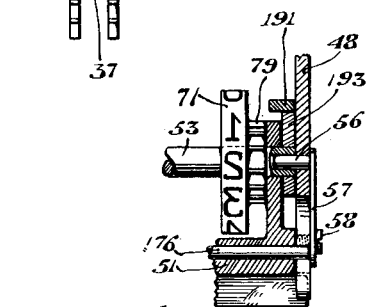
Inventor
Herman F. Sadgebury
By
Attorney May 8, 1934.   H. F. SADGEBURY   1,957,671
CASH REGISTER
Filed Sept. 25, 1926   5 Sheets-Sheet 4

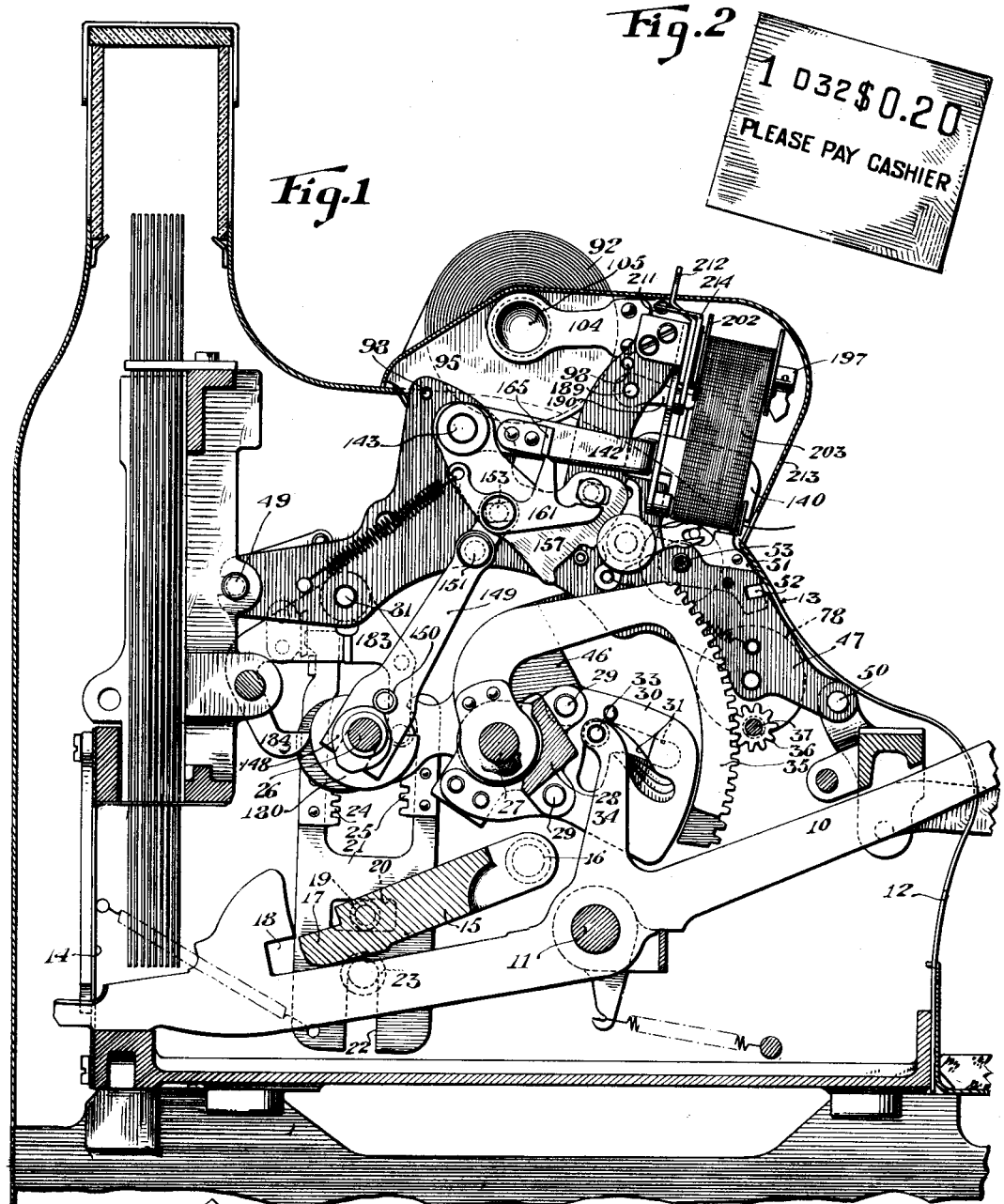

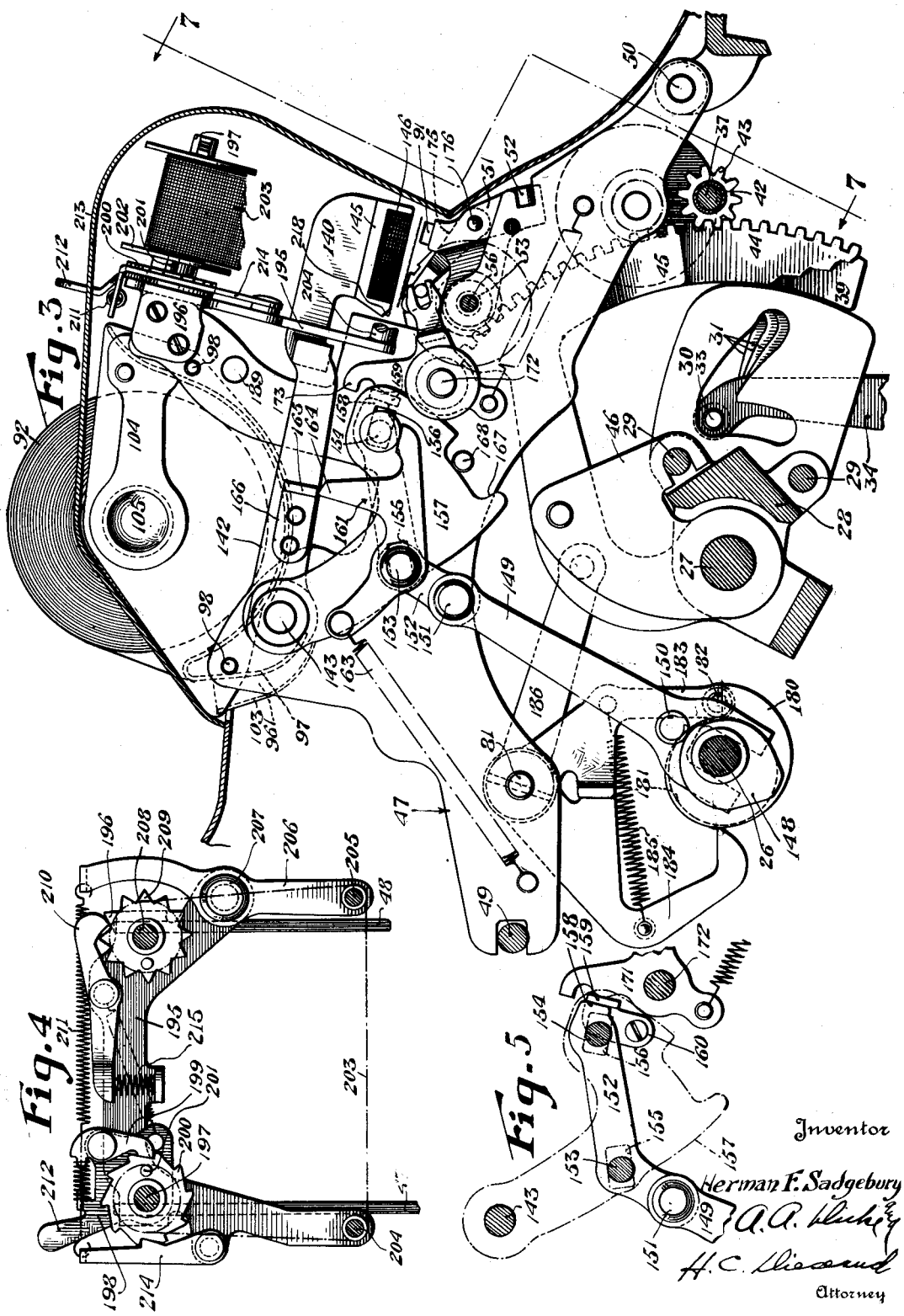

Inventor
Herman F. Sadgebury

Attorneys

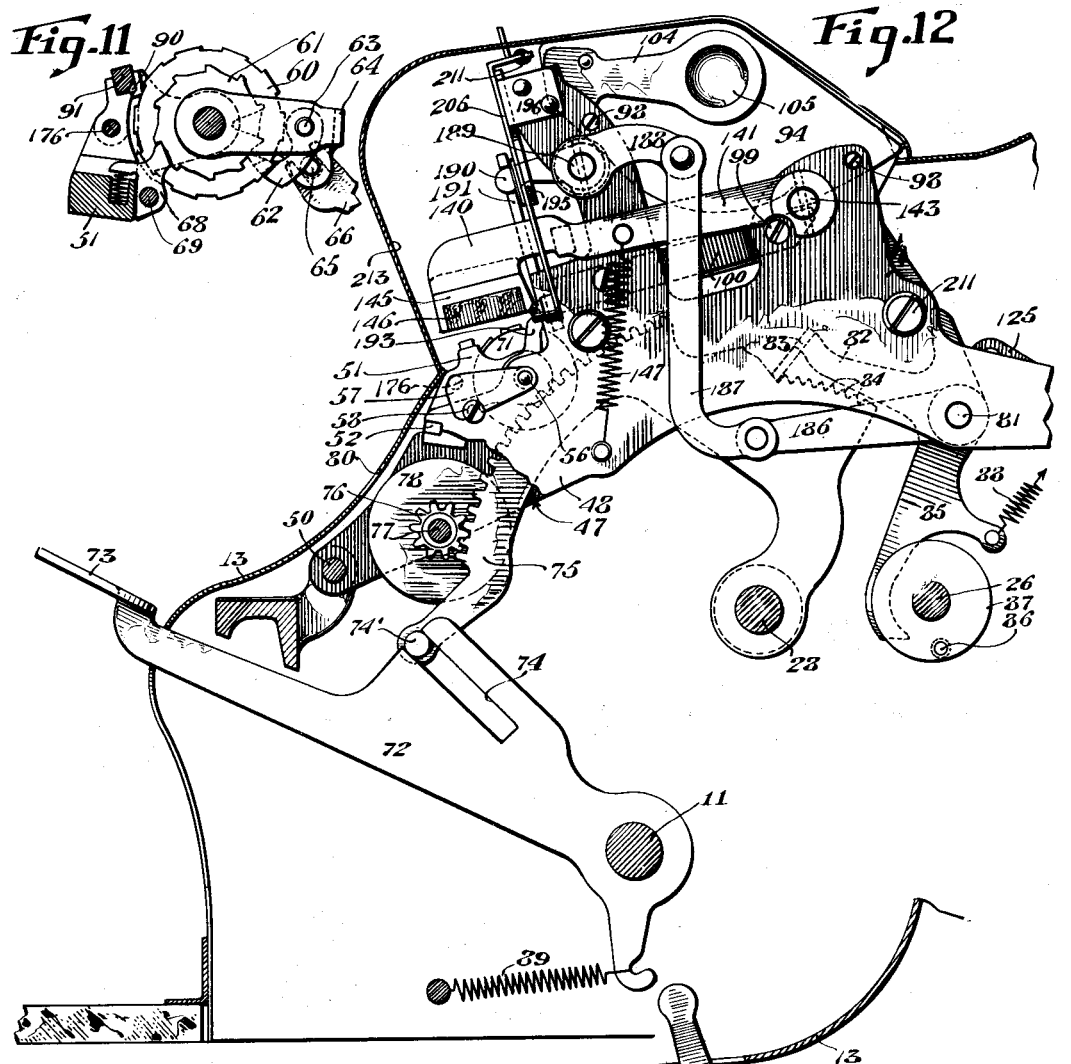
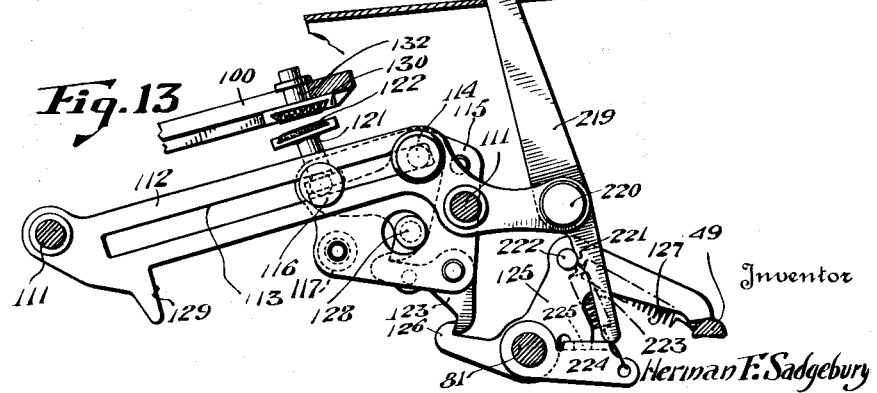

Patented May 8, 1934

1,957,671

UNITED STATES PATENT OFFICE 1,957,671

CASH REGISTER

Herman F. Sadgebury, Ilion, N. Y., assignor, by mesne assignments, to The National Cash Register Company, Dayton, Ohio, a corporation of Maryland Application September 25, 1926, Serial No. 137,664

29 Claims. (Cl. 235—3)

This invention relates to improvements in cash registers and accounting machines and has more particular reference to that class which are adapted to issue checks or tickets having amounts printed thereon commensurate with the value of the keys depressed.

To properly define the position of this invention in the art, machines of this type which are now in general use may be divided into two classes, viz; those in which the various functions such as, registering, indicating and recording are directly performed by the keys, and the other class, in which the keys are merely used to control certain devices the remainder of the operation of the machine being performed by a manually operated crank, or in some instances, by an electric motor.

Machines of the key operated class have the added advantage that operations of the machine are accelerated since it is only necessary to depress the keys and return them to their normal position, the various functions being performed during this cycle of operation. In any business employing a number of clerks the rapidity with which the machines may be operated is a prime and important consideration, because it requires fewer machines to accomplish the necessary work, reduces the amount of auditing, and, furthermore, affords more time to the employees to do other work.

Again, in the two-motion type of machine usually designated as key set machines and which are now in general use, a number of other functions are performed in addition to those usually performed by machines of the key-operated class. While additional devices are employed, and, therefore, more parts must operate the power to actuate them requires little consideration in the key-set type of machine since the prime mover may be so geared, or the power increased, to overcome the hard operations which would ensue if the same devices were applied to machines of the key-operated class. In contra-distinction to the heavy and cumbersome parts usually found in key-set machines, key-operated machines usually employ lighter parts, and the power utilized to operate those parts becomes an important and prime consideration since the source of power is limited, and a disregard of the principles which govern the design of a key-operated machine would result in a hard and slow operating machine defeating the characteristics of quickness and acceleration in operations. Therefore, it will be obvious that certain devices employed in key-set machines would have little utility when applied to machines of the other class.

Machines of the class operable by a crank or electric motor are usually equipped with a printing mechanism which serves satisfactorily to print and issue checks during operations of the prime mover. The devices utilized to perform these functions include parts which are usually heavy and rugged, and, therefore require considerable power to operate. The feeding devices usually comprise a pair of feeding rollers which are geared to the prime mover, the check paper being usually inserted between these rollers so as to feed the check out of the machine. Moreover, the devices utilized to print and sever the check comprise heavy parts which in themselves require considerable power to operate. Attempts have been made in the past to apply to machines of the key-operated class the same type of printing mechanism employed in key-set machines, with the result that such machines were hard to operate and in order to overcome the hard operation auxiliary power devices were usually added, which in themselves, were complicated, and apparently did not solve the problem of attaching a check-printing mechanism to key-operated machines.

The principal object of this invention is to provide a check printing mechanism for a key-operated machine so that all the functions incidental to check printing and issuing may automatically be performed by a manual depression of the keys without sacrificing speed of operation and requiring but a slight additional load upon the keys.

In order that the key-operated machines to which the improved printing devices are applied may be operated with a minimum of time and expenditure of energy it is an object of the invention to provide a novel paper feeding device which is positive in its operation and requires little power to operate. In the illustrative embodiment of the invention this comprises a pair of normally separated reciprocating members which, during their initial movement, are adapted to positively grip and hold the paper so that upon a continued operation of the machine the check will be fed to the proper point.

In connection with the novel paper feeding devices embodied in the illustrative machine, it is also an object to provide improved devices whereby the paper strip will be caused to be fed in substantially a straight line either during manual feeding operations or during feeding operations performed by the machine. This overcomes to a great extent the disabling of the machine which usually occurs when printing mechanism are jammed by the accumulation of check paper caused by the natural curl of the paper. The improved machine employs a very simple device for counteracting the natural curl of the paper.

The arrangement of the printing attachment is such that the roll from which the checks are drawn is visible, and in front of the operator, so that he will readily know when the supply of paper has been exhausted, and the design is such, furthermore, that a new roll of paper may be readily inserted by those unfamiliar with mechanical devices and within a minimum of time.

It is a still further object of the invention to provide an improved type of platen operating mechanism and aligning devices for the totalizer which are operated by a common member thereby reducing the number of parts usually employed to perform these functions.

It is also another object of the invention to provide an improved type of paper severing device, which, in the illustrative machine is spring-operated. One improved feature of the severing device is the construction whereby normally there is little or no tension in the spring which causes the knife to operate and this spring is tensioned during the downstroke of the operating key.

It is also an object of the present invention to provide a simple and effective type of inking device which in the illustrative machine comprises an inking ribbon which may be manually fed as desired.

Due to the peculiar and advantageous arrangement of the paper feeding devices the check paper may be readily inserted in the printing mechanisms and when it is desired to discontinue check issuing, the paper may readily be withdrawn since it is accessible and visible to the operator. However, by the employment of a special manipulative device with which the illustrative machine may be provided, a more convenient means of discontinuing issuing of checks may be afforded.

In the present preferred embodiment of the invention the printing mechanism comprises a plurality of item type carriers for printing amounts commensurate with the keys depressed. In addition to printing amounts, additional type elements are provided for printing certain data, such as, the legend "Please pay cashier" and devices for printing the serial or consecutive numbers upon the checks are also included. The machine disclosed is also provided with a special character printing element which may, for example, designate the number of customers included on a single check, the desired character to be printed being controlled by a special lever which is adjusted to the proper position prior to operations of the machine by the keys.

It is also an object of the present invention to provide an improved form of restoring device whereby the special character printing element will be automatically returned to its normal position during the end of the operation of the machine without any further attention from the operator.

The mechanism devised for effecting the various results are, however, capable of being used for other purposes, either as a whole or in part, and the statement of the objects is not intended as a limitation in this respect.

While the invention consists mainly of the provision of a check printing attachment for a key-operated machine many of the improved devices might be embodied in other types of cash registers and accounting machines and would result in a corresponding number of benefits and advantages. In fact, as will appear clearly after the construction is fully understood, the ideas are capable of embodiment in structurally separate check printing devices.

In the accompanying drawings the invention is shown applied to a cash register such as that fully illustrated and described in the U. S. patent to Frederick L. Fuller, No. 1,742,701, January 7, 1930, as well as the corresponding British patents to Fuller #135,465; 140,363; 157,823; 157,824; 157,825 of July 14, 1921. However, as has already been stated the invention is not limited in its application to any one particular kind of machine but is capable of application by various modifications to accounting machines in general.

With these and incidental objects in view the invention consists in certain novel features of construction and combination of parts, the essential elements of which are set forth in the appended claims, and a preferred form of embodiment of which will now be described with reference to the drawings which accompany and form part of the specification.

Of said drawings:

Fig. 1 is a sectional view of the illustrative machine taken substantially through its midportion the machine being shown with the improved devices applied thereto. This view shows particularly the differential devices, the platen operating mechanism and other details of the check printing devices.

Fig. 2 illustrates one of the checks capable of being issued by the improved devices.

Fig. 3 is a view in side elevation of the check printing devices showing the differential devices, the platen operating mechanism and the operating devices for the check severing means.

Fig. 4 is a front view of the inking devices incorporated in the improved printing mechanism.

Fig. 5 is a detail view of a number of parts associated with the platen operating mechanism.

Fig. 6 is a sectional view in side elevation illustrating the improved aligning devices for the type carriers.

Fig. 7 is a front sectional view of the printing mechanism, taken on the line 7—7 of Fig. 3.

Fig. 8 is a sectional view through the printing mechanism taken on line 8—8 of Fig. 10.

Fig. 9 is a central cross sectional view of the improved printing mechanism showing in detail the improved paper feeding devices.

Fig. 10 is a top plan view of the printing mechanism some of the members being removed to more clearly show other parts.

Fig. 11 is a fragmentary sectional view taken through the improved devices showing particularly the consecutive numbering type carriers and the associated operating devices.

Fig. 12 is an end view of the improved printing devices showing particularly the adjustable lever for setting up the special character printing element.

Fig. 13 is a fragmentary sectional view showing in detail the paper feeding devices in co-operation with the special manipulative device whereby the feeding devices may be enabled or disabled at will.

Fig. 14 is a fragmentary sectional view showing the devices utilized to hold one of the frames in its proper position.

Fig. 15 is a detail of one of the cams utilized to operate the severing devices.

For convenience of description the principal elements of the machine will first be enumerated and their general purpose, arrangement and cooperation will be briefly explained in order to indicate the general operation of the machine as a whole, after which the preferred construction of these parts will be described more in detail together with their function and operation.

As shown in the drawings the machine used to illustrate one embodiment of the invention is of the key-operated type of substantially the form disclosed in the U. S. and British patents to Frederick L. Fuller previously referred to. In this type of machine the various functions, such as, indicating, registering and sometimes recording are effected directly by the operation of the keys. Addition of the present improvements does not materially affect the operation of such a machine in the performance of any of these functions but when the keys are operated additional type carriers forming a part of the new mechanism are adjusted to represent the keys depressed and impressions are then taken from the type carriers upon a check strip which is, during the time the keys are operated fed out of the machine and severed from the rest of the check strip.

In the preferred embodiment if the operator desires to print a character other than that represented by the normal position of a special type printing element a setting lever is adjusted to its proper position and by means of a special indicator the position of the special type printing element may readily be ascertained. When the preliminary adjustment of the setting lever is completed the operator merely depresses the proper amount keys in the usual way which results in feeding the check paper over the adjusted item type carriers, the special printing element, as well as a series of consecutive numbering type carriers. Further operation of the machine causes the platen which has been retracted in the meantime, to be released so that impressions are taken upon the check strip from all of the type carriers as well as a fixed printing plate. During the first cycle of operation of the machine the operating devices for the consecutive numbering wheels are actuated so that a unit will be added to these wheels whereby the issued checks are serially or consecutively numbered. During the last part of the operation of the machine the setting lever will also be returned to its normal position.

In the machine shown a knife is employed whereby the strip is automatically severed to form a check so that the check may readily be withdrawn from a slot formed in the cabinet which entirely conceals the check printing mechanism. When the supply of paper has been exhausted, which is readily noted since it is in full view of the operator, a new roll is substituted and the free end of the check strip is forced into the printing mechanism, being guided by suitable devices so that it is at all times directed into the proper position.

After a series of printing impressions are effected through the same portion of the inking ribbon the printing impressions become light so that it is necessary to shift the ribbon to bring a fresh section into use. In the illustrative machine the inking ribbon is for this purpose, manually wound from one roll to the other. When the inking ribbon is entirely wound upon one roller the two rollers may be reversed and the ribbon again wound upon the empty spool. In this manner the life of the inking ribbon is lengthened considerably and the inking mechanism requires but little attention on the part of the operator.

With this general statement of the functions performed by the machine a detailed description of the various parts for accomplishing those functions will now be given.

The amount keys 10 (Fig. 1) are loosely pivoted upon a key shaft 11 so that they may be moved through an angle about said shaft as a pivot. The amount keys 10 are guided in their movements at their forward ends by slots 12 formed in a cabinet 13, and at their rearward ends by slots formed in a plate 14 which is attached to a portion of the framework. Resting upon the rear ends of the keys is a key coupler 15 provided with trunnions 16 by which it is pivoted, and with a flange 17 coacting with notches 18 formed in each of the operating keys. The key coupler serves in the usual way to insure simultaneous and uniform depression of the keys.

The key coupler is provided with a pin 19 extending through a horizontal slot 20 in an upright double rack member 21. The rack has a slot 22 embracing a fixed pin 23 and is thus guided in its vertical movement by the pin, but is rocked around the pin so that the sets of teeth 24, 25 carried by the rack member 21 will alternately engage a pinion (not shown) attached to the driving shaft 26 of the machine. The shaft 26 is the main shaft of the machine and carries cams and other devices for operating certain mechanisms which will be described hereinafter. This arrangement of operating mechanism is similar to that shown in the U. S. and British patents to Frederick L. Fuller hereinbefore referred to.

The differential mechanisms or devices controlled by each of the various banks of keys for adjusting type carriers are all similar in construction and principle and the description of these devices will therefore be confined to that associated with the dollars bank of keys.

Loosely mounted upon a transverse shaft 27 is a frame 28 provided with spaced slots in which are inserted and secured by pins 29 a series of cam plates 30. The cam plates 30 are provided with differentially inclined slots 31, the slot in each cam plate being correlated with a roller 33 carried by an upstanding arm 34 of the adjacent operating key 10. From the foregoing it will be evident that upon the depression of an amount key a differential movement will be imparted to the frame 28 and to the connected devices which will now be described.

In the illustrated machine the differential devices besides having other functions are utilized to adjust a plurality of type carriers for printing the amounts upon an issued check. To this end the differential frame 28 has connected thereto a segmental rack 35 which meshes with a pinion 36 attached to a transverse shaft 37. The other end of the shaft carries a pinion 38 (Fig. 7) which meshes with a segment 39 similar to the segment 35 but loose on the shaft 27.

A similar type of connection is effected between the differential devices for the dimes bank and the actuating segment for differentially adjusting the dimes type carrier, and in the present instance the segment rack 40 (Fig. 7) which is attached to the dimes differential frame meshes with a pinion 41 attached to a sleeve 42. The sleeve 42 carries at its other end a pinion 43 meshing with a segment 44.

In order to adjust the cents type carrier the differential frame 28 (Fig. 3) associated with the cents bank of keys has connected thereto a segmental rack 45. The segmental rack 45 is loosely mounted upon the shaft 27 but is connected to the differential frame 28 by the type of connection shown in Fig. 3 which comprises the plate 46, connected by a pin or rivet to the rack 45 and by means of a hook to one of the pins 29 of the frame.

The devices for printing and issuing checks are, in the main, carried by two side frames 47 (Fig. 1) and 48 (Fig. 12). The side frames are connected together in spaced relation by shafts and cross members so that most of the elements comprising the check printing devices may be carried by said framework. The framework is supported at its rear end by a transverse pin 49 and at its forward end by a pin 50 both of which pass through ears integral with the machine framework. By reason of this construction the printing unit as a whole may be readily detached from the machine for the purpose of inspection, adjustment, etc.

The type carriers forming part of the check printing devices are carried by an independent frame or casting 51 (Fig. 7). The frame 51 extends between the side frames 47 and 48 and is provided with rectangularly formed ears 52 fitting within similarly formed notches in each of the frames 47 and 48. The frame 51 carries a shaft 53 (Fig. 9) which is the supporting shaft for the item type carriers 54. Each of the item type carriers 54 is provided with a pinion 55 (Fig. 9) meshing with the teeth of its associated rack 39, 44, 45 so that by the connections just described the differential devices may adjust the associated type carriers to positions determined by the keys depressed. The type carrier associated with the cents bank of keys differs from the dollars and dimes type character, since the dollars type carrier is provided with a "$" character and, the dimes type carrier is provided with a period or decimal point.

In order to retain the frame 51 in its proper relationship with respect to the side frames 47 and 48 and to hold the shaft 53 rigid and in proper alinement, the shaft 53 at each end is counter-sunk so that it may receive a pin 56 (Figs. 12 and 14) riveted to a plate 57. Each plate 57 as shown in Fig. 14 is secured in its proper place by a screw 58 passing into the side frame.

It is considered desirable to consecutively number the checks issued from the machine and to carry out this result the illustrative machine is provided with a series of consecutive number printing wheels to which a unit is added during each operation of the machine.

The consecutive numbering counter is of the multiple pawl, deep notch transfer type, well known in the art and described in many patents, one of which is the patent to Thos. Carney, #876,295 dated January 7, 1908. The consecutive numbering wheels 60 (Figs. 7 and 11) are formed with printing characters and are loosely mounted upon the shaft 53. Each of these wheels has attached thereto a ratchet wheel 61 (Fig. 11) co-operating with a multi-prong actuating pawl 62. The actuating pawl is spring-pressed and pivotally mounted by means of a pin 63 in a bail 64 loosely mounted on the shaft 53. The bail 64 has attached thereto a pin 65 co-operating with an arm 66 (Fig. 9) which is loosely mounted upon the shaft 27. The arm 66 at its rearward end is bifurcated to cooperate with an eccentrically mounted disk 67 securely attached to the driving shaft 26. From this it will be readily understood that during each operation of the machine the arm 66 will be rocked and by means of the pin and slot connection to the bail 64 a unit will be added to the numbering wheels during each operation of the machine. In order to prevent retrograde movement of the numbering wheels there is provided a plurality of spring-pressed aligning pawls 68 (Fig. 11) which are carried by a shaft 69. The shaft 69 is carried by short rearward integral extensions 70 (Fig. 9) of the frame 51.

While the type carriers which have already been described comprising three item printing wheels and a series of consecutive numbering wheels ordinarily furnish sufficient information upon the issued checks, it is considered desirable in some types of business to print other identifying characters upon the checks. These characters have a particular significance depending upon the type of business in which the machine is used.

In alignment with the item type carriers and consecutive numbering type carriers, for this purpose is a special type carrier 71 (Fig. 12) which is normally in a position to print the digit " 1 " on the upper left hand corner of the checks, as shown in Fig. 2. As will be described hereinafter, any other digit in place of " 1 " may be printed by properly setting a lever.

Due to the fact that any desired characters may be printed by the special type carrier 71 considerable flexibility is afforded so that this device may be used advantageously in different businesses. In classes of business dispensing food and drinks for example, this digit will tell the cashier the number of people in the party to be paid for on a single check. In theatres and dance-halls the digit shows the number of people to admit on one check. At barber shops it may be utilized to indicate which barber gets credit for the transaction and in some mercantile establishments it may be used to identify the clerk, or show the number of parcels wrapped to be given to the customer on the single check.

In order to set the type carrier 71 to the desired position, there is loosely mounted upon the shaft 11 a setting lever 72 (Fig. 12) which projects through the machine cabinet and plays in a slot formed therein. By means of a bent portion 73 the lever may be rocked about its pivot to any desired position. The lever 72 is provided with a slot 74 cooperating with a stud 74' carried by a segment 75 loosely mounted upon the shaft 28. The forward portion of the segment is provided with gear teeth meshing with a pinion 76 (Fig. 7) securely attached to a shaft 77. Also connected to the shaft 77 is an indicator wheel 78 carrying the desired characters. The teeth of the segment 75 also mesh with a pinion 79 (Fig. 10) securely attached to the numbering wheel 71. The cabinet 13 is provided with an aperture 80 (Figs. 9 and 12) directly in line with characters on the indicator 78 so that the position to which the type carrier is adjusted may readily be observed.

In order to temporarily retain the setting lever when adjusted from its normal position there is loosely mounted upon a shaft 81 (Fig. 12) journaled between the side frames 47 and 48, an arm 82 provided with a bent portion 83 which is beveled so as to engage with ratchet teeth 84 formed on a rearward extension of the segment 75. The arm 82 is provided with a downward integral extension 85 which is in the plane of a roller 86 carried by a disk 87 attached to the driving shaft. A spring 88 is connected between the extension 85 and a fixed portion of the frame so as to urge the beveled end of the lug 83 into cooperation with the ratchet teeth 84. At substantially the end of the operation of the machine the pin 86 cooperating with the extension 85 will withdraw the bent portion 83 from cooperation with the ratchet teeth 84 permitting a spring 89 to draw the segment 75 and lever 72 to their normal positions at which time the special type carrier will again be positioned so as to print the numeral "1". In this manner whenever the lever is adjusted to any position from its normal, it will automatically be restored to its normal position without requiring any attention by the operator. It should also be stated that the ratchet teeth 84 are so formed that the lever may be moved manually in either direction so that if the lever is adjusted beyond the position desired it may be reversely returned to the proper position.

It is also desirable to print upon the check certain other wording such as shown in the illustrative machine, "Please pay cashier" or, if desired, the legends "Your receipt"; "Admission check", the merchant's name or any other wording may be adopted instead. As best shown in Fig. 10 the casting 51 at each end is provided with rectangular pockets 90 in which is securely fitted a printing element 91 (Fig. 9) in the shape of a rectangular block, the block being formed with raised printing characters. The illustrative embodiment shows but a single printing block but any number may be utilized by properly forming the parts so as to accommodate more than one block.

The checks which are issued are drawn from a check roll 92 (Fig. 9) the paper being wound upon the usual form of spool 93. The check roll receptacle comprises two side plates 94 and 95 (Figs. 1, 9 and 10) between which is extended a curved plate 96 which is bent so as to form a curved paper guiding plate 97 (Fig. 9). The members just referred to may be connected or attached to each other by any suitable means so as to form an integral unit and in the illustrative machine the unit is attached to the printer frame by screws 98 (Fig. 12) which pass through the plates 94 and 95 and into the side frame 47 (Fig. 1).

Secured by screws 99 (Fig. 10) between the side frames 47 and 48 is a block 100 which is undercut at 101 (Fig. 8) to a width substantially the width of the check strip. As best shown in Fig. 9 the check strip passes under the curved plate 97 and between the block 100 and the plate 102 which is provided with an integral rearwardly extending portion 103 curved and bent at its sides to form a paper guide or chute.

The check roll 92 is held in its proper position by means of spring grippers 104 (Figs. 1 and 12) which are riveted to the side plates 94 and 95 and are formed with concave depressions 105 which project through apertures in the plates 94 and 95 to engage apertures formed in the ends of the check supporting roll 93. By this means the roller may be readily be placed in the container or detached therefrom. By the present construction the engagement between the concave depressions 105 and the ends of the cylinder 93 constitutes but a line contact so there will be little frictional resistance when the check roll is rotated as the paper is fed by means which will now be described.

The paper feeding devices for the illustrative machine comprise an eccentrically mounted disk 106 (Fig. 9) co-operating with lugs 107 integral with a pitman 108 which is attached by a pin 109 to an arm 110 loosely mounted upon the shaft 27. By the mechanism just described the arm 110 is given a reciprocating movement during each operation of the machine.

Attached to the check printer side frame 48 by means of studs 111 (Figs. 8 and 13) is a guide plate 112 which is formed with a slot 113 in which projects a stud 114 carried by a plate 115 and another stud 116 also carried by the plate 115. The plate 115 has also attached to it a stud 117 (Fig. 9) engaging an open-ended slot formed in the arm 110, the stud being suitably recessed so as to receive a spring 118. The spring 118 also fits in a cup shaped member 119 (Fig. 8) which is attached to a plate 120 by an upwardly extending stud 121, the plate being loosely pivoted on the stud 114. The stud 121 is upset at one end to attach the cup 119 to the plate 120. The stud 121 has secured to its upper end a gripping member 122.

The spring 118 normally tends to force the gripping plate 122 upwardly but is prevented by means of a bell-crank 123 (Fig. 9) loosely mounted on the plate 115, the bell-crank being formed with a hooked portion engaging a shoulder 124 formed in the lower part of the plate 120. In order to disengage the hooked portion from the plate 120 at the desired time there is provided a second bell-crank 125 loosely pivoted upon the shaft 81 and having a hooked portion 126 engaging an extension of the bell-crank 123. The bell-crank 125 is urged by a spring 127 so that its rearward arm engages the stud 49 previously referred to. As best shown in Fig. 13 the plate 120 is provided with a stud 128 projecting through an aperture formed in the plate 115, the stud 128 being adapted to engage a shoulder 129 formed on the guide plate 112 when the plate 115 is shifted.

As best shown in Fig. 8 the check strip is located between the gripping member 122 and a cooperating gripping member 130 which fits in a recess formed in the plate 100 and is slidably mounted in the plate 100 by means of a stud 132 fitting in a slot 131 (Fig. 10). In order to insure that the gripping member 130 may receive the same movement as the associated gripping member 122 there is provided a bail or yoked member 133 pivoted to the plate 100 by means of a stud 134. The free end of the upper portion of the bail is forked to receive the stud 132 (Fig. 10) which carries the gripping member 130 and its lower portion (Fig. 8) is bifurcated to receive the stud 121 attached to the gripping member 122. The gripping surfaces may be comprised of rubber or any other suitable material so that at the desired times they may grip the check paper and feed it forwardly, the operation of the above described mechanism being as follows:

When one of the keys is depressed the shaft 26 will be rotated and the arm 110 will be rocked to the right as viewed in Fig. 9 and since the bell-crank 125 will hold the lower end of the bell-crank 123 against movement as the plate 115 is moving forwardly continued movement of the plate 115 and the plate 120 will cause the bell-crank 123 to rock clockwise (Fig. 9) to positively disengage the hooked portion of this bell-crank from the shoulder 124 of the plate 120. This will permit the spring 118 to raise the gripping member 122 to positively grip the check paper between it and the associated gripping element 130. Further depression of the keys will move the plate 120 and the gripping members still further forwardly and their gripping action upon the check paper will positively feed the latter over the adjusted type carriers. When the keys reach their extreme downward movement a printing impression is effected as will be described hereinafter. At about this time the stud 128 cooperating with the shoulder 129 will rock the plate 120 clockwise as viewed in Fig. 9, permitting it to be again latched by the bell-crank 123 whereby the two gripping members are separated. During the return movement of the keys the arm 110 will be moved in a reverse direction and when the plate 120 reaches its extreme rearward movement the bell-crank 125 will again engage the bell-crank 123, the parts then being in the position shown in Fig. 9. It will be obvious that since during each operation of the machine the gripping members grip the check paper at substantially the same time and feed it similar amounts the successively issued checks will be of a uniform length.

The platen for effecting printing impressions from the printing elements comprises a cross member 140 (Figs. 9 and 10) integral with which are two rearwardly extending arms 141 and 142, said arms being pinned to a shaft 143 extending between the frames 47 and 48. The cross member 140 has fixed to it by screws 144 a casting 145 in which is fitted a rubber impression block 146 which is of sufficient size to overlie all the printing elements. The rubber impression block 146 is elevated during each operation of the machine and then retracted by a spring 147 (Fig. 12) connected to the arm 141 so as to produce a printing impression upon the check paper.

In order to effect a printing impression at the proper time the following mechanism is provided:

Mounted upon the driving shaft 26 is a cam 148 (Fig. 3) adapted to elevate a pitman 149 since the latter carries a roller 150 co-operating with the profile of the cam. The pitman 149 is connected by a pin 151 to a bent plate 152, which carries two studs 153 and 154 (see Fig. 5) fitting in slots 155 and 156, respectively, which are inclined at different angles and formed in a plate 157 loosely mounted upon the platen supporting shaft 143. The forward end of the bent plate 152 terminates in a forward projection 158 normally engaging a lug 159 integral with a bracket 160 attached to the side frame 47. The stud 153 serves as the pivotal point of a retracting pawl 161 which is urged by a spring 163 so that its forward extension engages the head of the stud 154 and that its upward extension 164 cooperates with a lug 165 integral with a member 166 attached to the left platen supporting arm 142. The plate 157 is cut away to form a shoulder 167 adapted to cooperate with a stud 168 carried by the printer side frame 47.

The operation of the parts just described is as follows. During the downward depression of one of the operating keys, at which time the check paper is being fed forwardly and the item type elements are being adjusted differentially, the shaft 26 will be rotated and due to the profile of the cam the pitman 149 will be raised. Since the bent plate 152 is connected to the pitman 149 by the pin 151 it will also be elevated. Elevation of the bent plate 152 will also raise the retracting pawl 161 and due to the pin and slot connection between the bent plate 152 and the plate 157 the latter will be rocked counter-clockwise, it being understood that during this time the co-operation of the extension 164 with the lug 165 will gradually lift the platen upwardly against the tension of the spring 147 (Fig. 12) until the platen is some distance away from the adjusted type carriers.

At substantially the time the type carriers are differentially adjusted and are stationary the high point of the cam 148 cooperating with the roller 150 will give the bent plate 152 a further upward movement, but at this time the shoulder 167 will be in engagement with the stud 168 and further clockwise movement of the plate 157 is prevented. As the pitman 149 is still further elevated it will produce a movement of the plate 152 toward the right in Figure 3, the direction of movement being governed by the sliding of the studs 153 and 154 in the slots 155 and 156, respectively. At a certain point in the operation, the extension 164 of the retracting pawl which, at this time was moved upwardly and forwardly, will slide off and be disengaged from the lug 165 permitting the spring 147 to retract the raised platen thereby effecting an impression upon the check paper from both lines of type.

In order that the platen will immediately be moved upwardly after effecting a printing impression so as not to blur the paper while the type carriers and the platen operating mechanism are being restored to their normal position, during which time the latter does not have the function of retaining the platen elevated, there is provided a spring 169 (Fig. 9) which fits in a socket formed in the plate 100 and has one end cooperating with an integral extension 170 of the platen frame 140. The cooperation of the spring with the extension 170 of the platen tends to move the platen upwardly quickly after making a printing impression thus permitting the subsequent restoration of the differentially adjusted type carriers.

In order that the printing impression will be along a straight line, a suitable aligning mechanism is provided for the type carriers and in the construction shown it comprises a bell-crank 171 (Fig. 6) loosely mounted upon a stud 172 carried by the side frame 47. The bell-crank is urged by a spring so that an extension co-operates with the lug 159 of the bracket 160 previously referred to. The bell-crank 171 also carries another projection 173 which is in the plane of the extension 158 (Figs. 3 and 5) of the bent plate 152. The forward arm of the bell-crank is bifurcated to receive a pin 174 carried by an extension of an aligner 175 pivoted upon a shaft 176 carried by the casting 51. The aligner is provided with a plurality of aligning fingers 177 (Fig. 7) which are adapted to co-operate with the interdental spaces of the pinions 55.

At substantially the time the retracting pawl 161 is disengaged from the lug 165 the extension 158 will engage the projection 173 of the bell-crank 171 rocking the aligner so that the aligning fingers will co-operate with the gears and align the type carriers before printing is effected. It will be understood that the aligner is operated substantially at the same time that the retracting pawl is disengaged from the lug 165 of the block 166 so that by the time the elevated platen co-acts with the printing type the aligner will have adjusted the pinions and type carriers to effect a proper printing impression.

Attention is also directed to the fact that the shaft 176 (Fig. 12) is carried by the casting 51 and to prevent its lateral displacement the plates 57 are adapted to co-operate with the ends of the shaft 176.

After the check paper has been fed over the type carriers and printing has been effected it is desirable to cut the printed portion from the rest of the strip so as to form a check which may readily be withdrawn from the printing mechanism.

The paper severing devices in the illustrative machine comprise, as shown in Fig. 3, two cams attached to the driving shaft 26, one designated by reference character 180 and the second 181 the latter being an eccentrically mounted disk. The cam 181 cooperates with a roller 182 on an arm 183 loosely mounted on the shaft 81. The other cam 180 cooperates with a curved member 184 which is rigidly secured to the shaft 81, a spring 185 being stretched between the members 183 and 184. Normally this spring has very little tension but when the shaft 26 is operated the eccentrically mounted disk 181 will rock the arm 183 tensioning the spring 185 and by the movement of the cam 180 against the curved member 184 will further tension the spring 185. At a certain point in the operation of the machine which in the embodiment shown is substantially the beginning of the up-stroke of the keys, the member 184 will drop off the high part of the cam 180 and due to the tension stored in the spring 185 will rock the shaft 81 counterclockwise quickly and through an arm 186 attached to the shaft 81 will raise a pitman 187 (Fig. 12). The pitman 187 is connected to an arm 188 fast to a shaft 189 which is journaled between the upper ends of the side frames 47 and 48. The shaft 189 carries a pair of forwardly extending arms 190 (Fig. 7) fitting in slots formed in a slidable guillotine knife 191. This knife co-operates with a stationary knife 192 which is suitably apertured so as to permit the check strip to be projected through said aperture. The knife 191 is urged against the stationary knife 192 by a pair of arms 193 (Fig. 9) both of which are loose on the shaft 53 but are urged rearwardly by springs 194. Rocking of the shaft 189 through the pitman 187 will force the knife 191 downwardly and by means of the cutting edges on the latter as well as the knife 192 will sever the advanced check strip.

The inking mechanism for the printing mechanism herein shown comprises an inking ribbon which overlies the type carriers and which may be manually spaced whenever desired so that a fresh portion of the inking ribbon will be presented to the type carriers.

The inking device is carried by a transverse plate 195 (Fig. 4) extending between the side frames, the plate having integral brackets 196 (Fig. 3) by means of which the plate is attached to the side frames. Loosely mounted on a stud 197 and securely attached to the plate 195 is an arm 198 (Fig. 4) which carries a feeding pawl 199 cooperating with a ratchet wheel 200 also loosely mounted upon the stud. The ratchet wheel is provided with a pin 201 which fits in an aperture formed in a flange 202 (Fig. 3) of a spool around which an inking ribbon 203 is wound. The inking ribbon is drawn from the spool around a roller 204 (Fig. 4) carried by a fixed pivot on a downward extension of the plate 195; the inking ribbon then passes transversely directly over the type elements and then around a roller 205 carried by an arm 206 which is loosely mounted on a stud 207 carried by the plate 195. The other end of the inking ribbon is wound upon an inking roller which is loosely mounted upon a stud 208 carried by the plate 195. A pin and slot connection is also effected between this inking roller and a star wheel 209, the interdental spaces of which cooperate with a spring urged holding pawl 210. In order that the inking ribbon 203 will be drawn taut the arm 206 extends upwardly and has connected to it a spring 211 which urges the roller 205 in such a direction as to place a tension upon the inking ribbon 203.

In order to manually feed the inking ribbon when the impressions become light the arm 198 is provided with a finger piece 212 which, as shown in Fig. 3, projects through a hinged cover 213 which entirely conceals the check printing devices. By this means the inking ribbon may be fed when desired. To prevent retrograde movement of the inking ribbon and to hold it at the feeding end so that the roller 205 may supply the necessary tension there is provided a retrograde pawl 214.

It will be remembered that the platen is elevated during each printing impression and during the retracting movement it will strike the inking ribbon 203 to produce the printing impression. The successive striking of the inking ribbon against the type carriers by the platen would under ordinary conditions cause the fibers of the inking ribbon 203 to break causing the ribbon to stretch and sag and possibly interfering with the feeding movement of the check paper over the type carriers. This strain upon the ribbon is effectively prevented in the illustrative embodiment, however, by means of the spring-urged roller 205, since it will be observed that as the platen drops upon the inking ribbon 203 and forces the inking ribbon downwardly the latter is held against movement at one end by the retrograde pawl 214 and at the other by the pawl 210 engaging the star wheel 209 but the arm 206 will rock clockwise against the tension of the spring 211, thus providing the necessary slack. When the platen is elevated to its normal position and relieved of contact with the inking ribbon, the tension in the spring 211 will rock the arm 206 reversely and will adjust the inking ribbon so that it is again taut.

In some machines equipped with printing devices considerable annoyance is caused the operator when a new supply of paper is inserted in the machine primarily due to the fact that on account of the natural curl of the end of the check paper the strip tends to deviate from the proper course. The result of this is that the operator is required to spend considerable time in threading the paper strip and to obviate this difficulty the illustrative machine is provided with a simple and effective device.

Attached to the underside of the plate 100 is a pair of forwardly extending springs 216 (Figs. 8 and 9) which are suitably bent so as to leave an opening between the underside of the plate and the top of the spring to permit the passage of the check paper between. The ends of the springs underlie the extreme forward end of the plate 100 which end is machined so as to form a curved extension 217 (Fig. 9). When the end of the check strip is passed into the chute 961 and forced forwardly the natural curl of the paper, would, if no means were provided to prevent it, tend to pass upwardly and possibly behind the platen. With the provision of the curved extension 217 and the springs 216 when the end of the check strip passes between these elements the curl of the paper will be counteracted with the result that the check paper will pass straight forwardly beneath the platen and over the inking ribbon. In the event that the end of the check strip should strike the platen it will strike a beveled portion 218 (Fig. 9) of the casting 145 so that it will be directed downwardly to the proper position. It is to be understood that this construction does not only function during manual feeding operations but also during the feeding operations of the check strip by operations of the machine.

When it is desired, as is often the case in some lines of business or under certain conditions to use the machine without the check printing attachment, the check strip may be simply withdrawn from the chute and reinserted in the same way when it is desired to renew the issuing of checks.

In the illustrative machine this can be performed in a very facile manner since the cooperating feeding elements are normally separated as well as due to the simple and effective devices which have been provided for guiding the check strip. As a more convenient means for throwing the paper feeding device out of operation and into operation at will, there may be provided a check controlling lever 219 (Fig. 13). The lever is pivotally mounted by means of a stud 220 and extends upwardly through a slot in the cabinet 13 of the machine so as to be adjustable to either a "Check" or "No check" position. The position shown in the drawings is the one it assumes when it has no control over the paper feeding devices and therefore permits them to operate in the usual manner. However, when it is desired to discontinue check feeding without withdrawing the paper strip from the machine the lever 219 may be forced rearwardly so that a shoulder 221 cooperating with the stud 222 attached to the bell-crank lever 125 will rock the bell-crank counter-clockwise thereby disengaging the hooked end 126 from the extension of the bell-crank 123. Loosely mounted upon the shaft 81 and urged upwardly by a spring 223 is a detent plate 224 having a lug provided with an aperture 225 which co-operates with the lower end of the lever 219 when the latter is moved to the "No check" position. It is to be understood that since the hooked portion 126 is entirely disengaged from the bell-crank 123 the latter will not be tripped during an operation of the machine thus permitting the paper gripping elements to remain disengaged so that they will not be operative to feed the check paper.

*Summary of operation*

The nature of the improved mechanism is such that in order to make the foregoing description as clear as possible, it was necessary to state the operation considerably in detail as an incident to explaining the various features of construction, and a complete restatement here of the operation is therefore believed to be unnecessary. However, a résumé of the general operation of the machine will now be given to co-ordinate the operations and functions of the various parts which have been described in detail.

It will be assumed that the operator desires to issue a check for the amount of 20¢. In the illustrative machine to issue a check commensurate with this amount it is only necessary to depress the appropriate key and permit it to return to its normal position, the various functions of check issuing, printing and severing being performed during this cycle of operation.

When the appropriate key in the dimes bank is depressed the notch 18 (Fig. 1) in the rear end of the key will engage the flange 17 of the key coupler and since the coupler is connected to the rack plate 21 the latter will be elevated and by the alternate engagement of its rack teeth 24 with the pinion attached to the driving shaft 26 it will give the latter a complete operation.

As the roller 33 carried by the arm 34 of the depressed key works in the cam slot 31 of its associated cam plate 30 it will rock the dimes frame 28 differentially and through the shaft 41 (Fig. 7) will move the segmental rack 44 differentially thereby adjusting the associated type carrier 54 to bring the character "2" to the printing point.

Assuming that the check strip is properly located between the associated gripping members it will be obvious that when the key is depressed the cam 106 (Fig. 9) co-operating with the lugs 107 will rock the arm 110 forwardly and since the bell-crank 125 will hold the lower end of bell-crank 123 against movement as the plate 115 is moved forwardly, the continued movement of the plate 115 and the plate 120 will cause the bell-crank 123 to rock clockwise to positively disengage the hooked portion of the bell-crank 123 from the shoulder 124 of the plate 120. This will permit the spring 118 to raise the gripping member 122 to positively grip the check paper between it and the associated gripping member 130. The gripping action upon the check paper occurs at substantially the initial movement of the keys so that further depression of the keys will feed the check paper over the type carriers.

When the shaft 26 is operated the disk 181 (Fig. 15) will rock the arm 183 thereby tensioning the spring 185 while the cam 180 (Fig. 3) at the same time acting against the curved member 184 will further tension the spring 185. When the shaft 81 is being rocked by the arm 184 it will, through the arm 186 move the pitman 187 (Fig. 12) downwardly and through the shaft 189 and arms 190 will elevate the knife 191 so that at substantially the time the keys are fully depressed the knife 191 will be fully retracted in preparation for release to sever the check paper, but before the knife returns to its normal position to sever the check paper the printing impression will be effected.

During the downward depression of the keys the pitman 149 (Fig. 3) will be raised by the cam 148 also secured to shaft 26, thus elevating the bent plate 152 so as to raise the platen retracting pawl 161. Due to the pin and slot connection between the bent plate 152 and the plate 157 the latter will be rocked counter-clockwise, the platen being elevated during this time against the tension of the spring 147 (Fig. 12).

At substantially the time the type carriers are fully differentially adjusted and are stationary, the high point of the cam 148 co-operating with the roller 150 will give the bent plate 152 a further upward movement and since at this time the shoulder 167 is in engagement with the stud 168 further clockwise movement of the plate 157 is prevented. As the pitman 149 is further elevated it will cause a movement of the plate 152 upwardly and forwardly relative to plate 157, and at a certain point in the operation, which in the machine shown is at the time the type carriers are fully adjusted, the extension 164 of the retracting pawl will slide off of and be disengaged from the lug 165 thus permitting the spring 147 to return the raised platen thereby effecting an impression upon the check paper from both lines of type, and producing a check of the type shown in Fig. 2.

Just prior to or substantially at the time the retracting pawl is disengaged from the lug 165 the extension 158 of plate 152 will engage the projection 173 (Fig. 6) of the bell-crank 171 thereby rocking the aligner 175 so that the aligning fingers will cooperate with the gears and align the type carriers before printing is effected.

In the machine shown when the keys are returned to their normal positions after being fully depressed, the member 184 (Fig. 3) will drop off the high part of the cam 180 and due to the tension stored in the spring will rock the shaft 189 (Fig. 9) clockwise and through the forwardly extending arms 190 will force the knife 191 downwardly and by means of the cutting edge on the knife will sever the advanced check strip.

During the downward movement of the keys the cam 67 (Fig. 9) will rock the arm 66 clockwise and through the bail 64 will actuate the feeding pawl 62 (Fig. 10) so that it will add a unit to the units numbering wheel during the down-stroke of the operating keys. In this manner a unit is added to the consecutive numbering wheels during the first half of the cycle of operation so that at a subsequent printing operation the numbering wheels will print a number differing by a unit from that printed upon the previously printed and issued check.

The platen will also print the numeral "1" from the normally positioned type carrier 71, (Fig. 12) in line with the consecutive number printed from the consecutive numbering wheels 60 as well as in alignment with the amounts printed by the various item type carriers 54. As shown in Fig. 2, there will also be printed the legend "Please pay cashier" which is printed by the special printing electroblock 91. After the check has been printed and issued it may be manually withdrawn from the slot formed in the cabinet cover 213.

In the operation just described it was assumed that it was desired to print the numeral "1" from the special type carrier 71, but if the operator desires to print another numeral or character the setting lever 73 (Fig. 12) will be adjusted to its proper position, the proper positioning of the lever 73 and the type carrier 71 being ascertained by noting the reading on the indicator wheel 78 which is visible through the slot 80 formed in the cabinet 13.

Co-operation of the lug 83 with the ratchet teeth 84 will temporarily retain the setting lever in its adjusted position and at substantially the extreme end of the operation of the machine the pin 86 co-operating with the extension 85 will withdraw the lug 83 from the ratchet teeth 84 permitting the segment 75 and lever 73 to be restored to their normal positions at which time the special type carrier will again present the character "1" at the printing point.

When the printing impressions become light the inking ribbon may be manually advanced by means of a finger-piece 212, which, when moved to the right (Fig. 4) will, through the feeding pawl 199, rock the ratchet wheel 200 and connected inking roller clockwise and by successive manipulations of the finger piece 212 a fresh portion of the ribbon may be presented to the type carriers.

When the supply of paper is exhausted which is readily noted, due to the fact that the paper roll projects through the hinged cover 213, the spool 93 (Fig. 9) around which the check paper is rolled is withdrawn from co-operation with the spring-urged fingers 105 and a new roll placed therein. The end of the check paper is then passed into the chute 961 (Fig. 9) between both paper feeding elements, forwardly over the type carriers and beneath the rubber impression block 146. The machine is now conditioned for further printing and issuing of checks.

While the form of mechanism herein shown and described is admirably adapted to fulfill the objects primarily stated it is to be understood that this embodiment is merely illustrative, as the invention is susceptible of embodiment in various other forms all coming within the scope of the claims which follow:

What is claimed is:

1. In an accounting machine, the combination of a pair of side frames, a platen carried by said frames, a plurality of indicia bearing elements, a member adapted to receive and support said elements and provided with ears, recesses formed in the side frames for receiving said ears, and means for holding said member in proper relationship with the side frames.

2. In an accounting machine, the combination of a pair of side frames, a removably mounted member, indicia bearing elements, a shaft carried by said member for supporting said elements, and removable pins passing through the side frames and engaging the end portions of the shaft for holding said member in position on said frames.

3. In an accounting machine, the combination of a pair of side frames, a member carrying a shaft and provided with ears, a plurality of indicia bearing elements carried by the shaft, recesses formed in the side frames for receiving said ears, and removable pins passing through the side frames and engaging the end portions of the shaft for holding said member in position on said frames.

4. In an accounting machine, the combination of a pair of side frames, a plurality of actuating racks, a removably mounted member carrying a shaft, a plurality of indicia bearing elements mounted on the shaft, and adapted to be operated by the actuating racks, and removable pins passing through the side frames and engaging the end portions of the shaft whereby the indicia bearing elements are held in proper relationship with the actuating racks.

5. In an accounting machine, the combination of a pair of side frames, a platen carried by said frames, a plurality of actuating racks, a removably mounted member provided with ears, a plurality of indicia bearing elements carried by said member and adapted to be operated by the actuating racks, recesses formed in the side frames for receiving the ears, and removable pins for holding the member in position on said frames thereby retaining the indicia bearing elements in proper relationship with the actuating racks.

6. In a cash register, the combination of item printing wheels, of keys for adjusting the same, an operating mechanism driven by the keys, a special printing wheel for printing special characters in conjunction with items, a manipulative device for setting the special printing wheel, an indicator geared to the manipulative device adapted to visually indicate the position of the special printing wheel, a resetting spring put under tension by said manipulative device, a latch for holding the special printing wheel when in set position, said latch being so constructed that the manipulative device may be moved in either direction, and a trip for the latch operated by the operating mechanism to automatically release the special printing wheel and indicator after the printing has been effected.

7. In a cash register, the combination of item printing wheels, keys, for adjusting the same, an operating mechanism driven by the keys, of a special printing wheel for printing special characters in conjunction with items, a lever geared to the special wheel for adjusting the latter, an indicator geared to the lever for indicating the positions of the special printing wheel, a resetting spring for the lever, a ratchet segment integral with the lever, a pawl co-operating with the ratchet segment, said pawl being spring urged into engagement with said ratchet segment and being so constructed that said pawl will ratchet over said segment when said lever is moved in either direction, and a trip actuated by the operating mechanism for automatically disengaging the pawl from the ratchet after printing has been effected to release the special wheel and permit the spring to return it and the setting lever to initial position.

8. In a machine of the class described, the combination with a series of amount keys, of a printing mechanism common to and adapted to print the value of the operated amount keys upon a paper strip, reciprocating paper feeding devices actuated by the keys to project the strip from the machine, severing devices for severing the paper strip when advanced, and means for disabling the paper feed devices at will when it is desired to discontinue feeding of the paper.

9. In a machine of the class described, the combination with a series of amount keys, of a printing mechanism common to and actuated by the keys to print the value of the operated amount keys upon a paper strip, a pair of normally separated reciprocating paper feeding devices actuated by the keys to positively grip and feed the paper to the printing point, and means whereby the paper feeding devices may be disabled at will.

10. In an accounting machine, the combination with a type carrier, of a series of keys for differentially adjusting the type carrier, of a platen operated by the keys to take an impression on a check strip, a reciprocating frame, a device carried by said frame for gripping the check strip, means normally latching the gripping device in ineffective position, and means whereby operations of the keys will disable the latching means.

11. In an accounting machine, the combination with a type carrier, of a series of keys, a platen, means operated by the keys for differentially adjusting the type carrier and then operating the platen for the purpose of taking an impression on a check strip, an invariably moved frame for feeding the check strip, a device carried by said frame for gripping the check strip, means normally holding the device in ineffective position, and means whereby an initial movement of the keys will disable said holding means.

12. In an accounting machine, the combination with a type carrier, of a series of keys, a platen, means operated by the keys for differentially adjusting the type carrier and then operating the platen for the purpose of taking an impression upon a check strip, an invariably moved frame for feeding the check strip, a device carried by said frame for gripping the check strip, means normally holding the device in ineffective position, means whereby initial operations of the keys will disable said holding means, and a manipulative device for disabling the last mentioned means.

13. In a machine of the class described, the combination with type carriers, of keys for differentially adjusting the same, and thereafter causing an imprint of the selected type upon a check strip, a pair of normally inoperative gripping devices, a latch for holding one of said devices inoperative, means controlled by the keys for disabling the latch, and spring means for bringing the gripping devices into co-operative relationship with the check strip after the latch is disabled.

14. In a printing mechanism, the combination with type carriers for printing on record material, of keys for differentially adjusting said carriers, and reciprocatory devices operated by the keys and adapted to grip the record material during movement of the devices in one direction whereby the record material is positively fed in a constant direction, said type carriers and reciprocatory devices being disposed in a position above said keys.

15. In a printing mechanism, the combination with type carriers for printing on a paper strip, of keys for differentially adjusting said carriers, paper feeding devices comprising a pair of normally separated reciprocatory gripping devices actuated by the keys, a spring for urging the gripping devices to grip the paper, a pawl for preventing action of the spring, and means for disabling said pawl.

16. In a printing mechanism, the combination of type carriers for printing upon a paper strip, keys for differentially adjusting the type carriers, an operating mechanism driven by the keys, a reciprocatory member driven by the operating mechanism, a frame having an operative connection to the reciprocatory member, said frame carrying paper gripping devices adapted to grip the paper strip during movement of the devices in one direction whereby the paper strip is fed in constant direction, said type carriers and paper gripping devices being disposed in a position above said keys.

17. In a machine of the class described, the combination with type carriers, a platen adapted to co-act with the type carriers to effect a printing impression upon a record material, an operating mechanism, a cam driven by the operating mechanism, a pawl adapted to retract the platen, and means controlled by the cam whereby the pawl is given an upward movement to retract the platen and then a sliding movement in another direction to be disengaged from the platen.

18. In a machine of the class described, the combination with type carriers, a platen adapted to co-act with the type carriers to effect a printing impression upon a record material, an operating mechanism, a cam driven by the operating mechanism, a pawl adapted to retract the platen, means controlled by the cam whereby the pawl is given an upward movement to retract the platen and then a sliding movement in another direction to be disengaged from the platen, and a spring for urging the platen against the type carriers.

19. In a machine of the class described, the combination with type carriers, of a platen co-acting with the same, a driving cam, a plate, a pawl for retracting the platen, and connecting means between the cam, the pawl, and the plate whereby the plate and pawl are actuated simultaneously to retract the platen and means causing said pawl to then operate independently of the plate to disengage the pawl from the platen.

20. In a machine of the class described, the combination with type carriers, of a platen co-acting with the same, a driving cam, a plate, a pawl for retracting the platen, connecting means between the cam, the pawl, and the plate whereby the plate and pawl are actuated simultaneously to retract the platen and means causing the pawl to then operate independently of the plate to disengage the pawl from the platen, and a spring for urging the platen against the type carriers.

21. In a machine of the class described, the combination with type carriers, of a platen co-acting with the same, a driving cam, a plate, a pawl for retracting the platen, connecting means between the cam, the pawl, and the plate whereby the plate and pawl are actuated simultaneously to retract the platen and means for causing the pawl to operate independently of the plate to disengage the pawl from the platen, and an aligning device for aligning the type carriers when the pawl is disengaged from the platen.

22. In a machine of the class described, the combination with type carriers, of a platen co-acting with the same, a driving cam, a plate, a pawl for retracting the platen, connecting means between the cam, the pawl, and the plate whereby the plate and pawl are actuated simultaneously to retract the platen and means for causing the pawl to operate independently of the plate to disengage the pawl from the platen, and an aligning device for aligning the type carriers when the pawl is disengaged from the platen, said aligning device being operated by said connecting means.

23. In a cash register, a printing wheel for printing special characters, a manipulative device for setting said wheel, an indicator geared to the manipulative device adapted to visually indicate the position of the special printing wheel, a resetting spring put under tension by said manipulative device, a latch for holding said special printing wheel when in set position, said latch being so constructed that said manipulated device may be moved in either direction, and a trip for releasing said latch.

24. In a cash register, a printing wheel for printing special characters, a lever geared to said wheel for adjusting the latter, an indicator geared to the lever for indicating the positions of said wheel, a resetting spring for the lever, a ratchet segment, integral with the lever, a pawl cooperating with the ratchet segment, and a trip for disengaging the pawl from the ratchet to release said wheel and permit the spring to return said wheel and the setting lever to initial position.

25. In a cash register, a series of keys, operating mechanism driven thereby, a printing wheel for printing special characters, a manipulative device for setting said wheel, an indicator controlled by said manipulative device for visually indicating the position of said special printing wheel, restoring means controlled by said manipulative device, latching means for holding the special printing wheel when in set position, said latching means being so constructed that the manipulative device may be moved in either direction, and a trip for said latching means controlled by the operating mechanism to automatically release the special printing wheel and indicator after printing has been effected.

26. A printing device comprising a pair of spaced parallel side frames, a platen carried by said frames, a typewheel bearing a plurality of indicia, a support member adapted to receive and support the typewheel and provided with ears, recesses formed in the side frames for receiving said ears, and means for holding the support member in proper relationship with respect to the side frames.

27. A printing device comprising a pair of spaced parallel side frames, a removably mounted support member, a typewheel bearing a plurality of indicia, a shaft carried by the support member for supporting the typewheel, and removable pins passing through the side frames and engaging the end portions of the shaft for holding said support member in position on said side frames.

28. A printing device comprising a pair of side frames, a support member carrying a shaft and provided with ears, a typewheel carried by said shaft, recesses formed in the side frames for receiving said ears, and removable pins passing through the side frames and engaging the end portions of the shaft for holding said support member in position on said side frames.

29. In a cash register, the combination of a type wheel bearing indicia adapted to be printed, a manipulative device for setting the type wheel, means for visibly indicating the position of the typewheel, a resetting spring adapted to be put under tension by said manipulative device, a latch for holding the typewheel when in set position, said latch being so constructed that the manipulative device may be moved in either direction, a platen for printing from said typewheel, and a trip for the latch adapted to automatically release the typewheel after the printing has been effected.

HERMAN F. SADGEBURY.